United States Patent
Iino

(10) Patent No.: US 7,055,772 B2
(45) Date of Patent: Jun. 6, 2006

(54) RECORDING TAPE CARTRIDGE

(75) Inventor: Wataru Iino, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/640,638

(22) Filed: Aug. 14, 2003

(65) Prior Publication Data

US 2004/0041052 A1    Mar. 4, 2004

(30) Foreign Application Priority Data

Aug. 30, 2002    (JP)    ............................. 2002-255102

(51) Int. Cl.
*G11B 23/107*    (2006.01)

(52) U.S. Cl. ..................... 242/348; 360/132

(58) Field of Classification Search ................ 242/348, 242/348.1, 348.2, 348.3, 348.4; 360/132
See application file for complete search history.

(56) References Cited

U.S. PATENT DOCUMENTS

| | | | | |
|---|---|---|---|---|
| 4,158,871 A * | 6/1979 | Leaming | ..................... | 360/132 |
| 4,631,618 A * | 12/1986 | Ozawa et al. | ................ | 360/132 |
| 5,086,363 A * | 2/1992 | Katagiri et al. | .............. | 360/132 |
| 5,253,136 A * | 10/1993 | Suzuki et al. | ................ | 360/132 |
| 5,261,259 A * | 11/1993 | Ployd | ......................... | 360/132 |
| 5,926,351 A * | 7/1999 | Abe | ........................... | 360/132 |
| 6,477,010 B1 | 11/2002 | Johnson et al. | ............. | 360/132 |
| 6,764,037 B1 * | 7/2004 | Hancock et al. | ............ | 242/348 |

* cited by examiner

*Primary Examiner*—William A. Rivera
(74) *Attorney, Agent, or Firm*—Sughrue Mion, PLLC

(57) ABSTRACT

A recording tape cartridge comprises: a case which is substantially rectangular, and at which an upper case and a lower case are joined together with peripheral walls thereof abutting one another, and which rotatably accommodates a single reel on which a recording tape is wound; and an opening formed at a corner portion of the case at a side of loading the case into a drive device, the opening being for pulling out of a leader member attached to an end portion of the recording tape. Concave portions, which extend over the upper case and the lower case and which are isosceles trapezoidal in plan view, are formed at a peripheral wall of the case at the side of loading the case into the drive device. In accordance with this structure, a peripheral wall, whose end portion is a free end due to an opening being formed, can be reinforced, and thereby a deterioration in strength of the peripheral wall can be prevented.

23 Claims, 6 Drawing Sheets

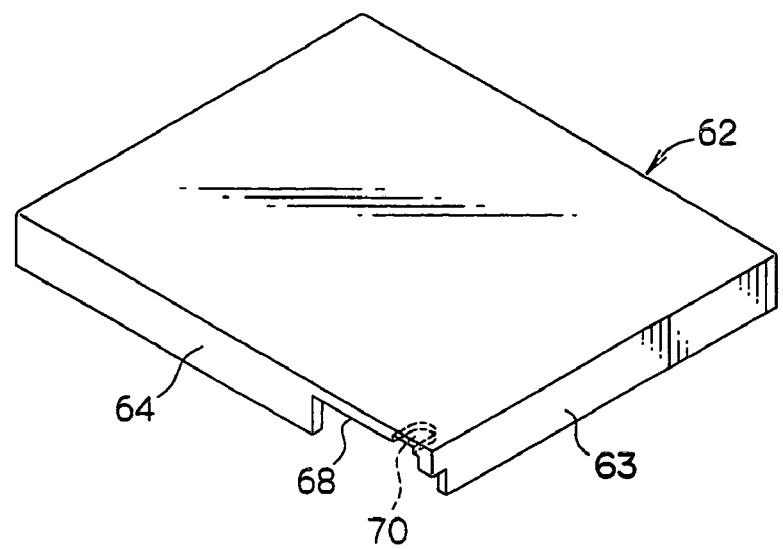
FIG. 6
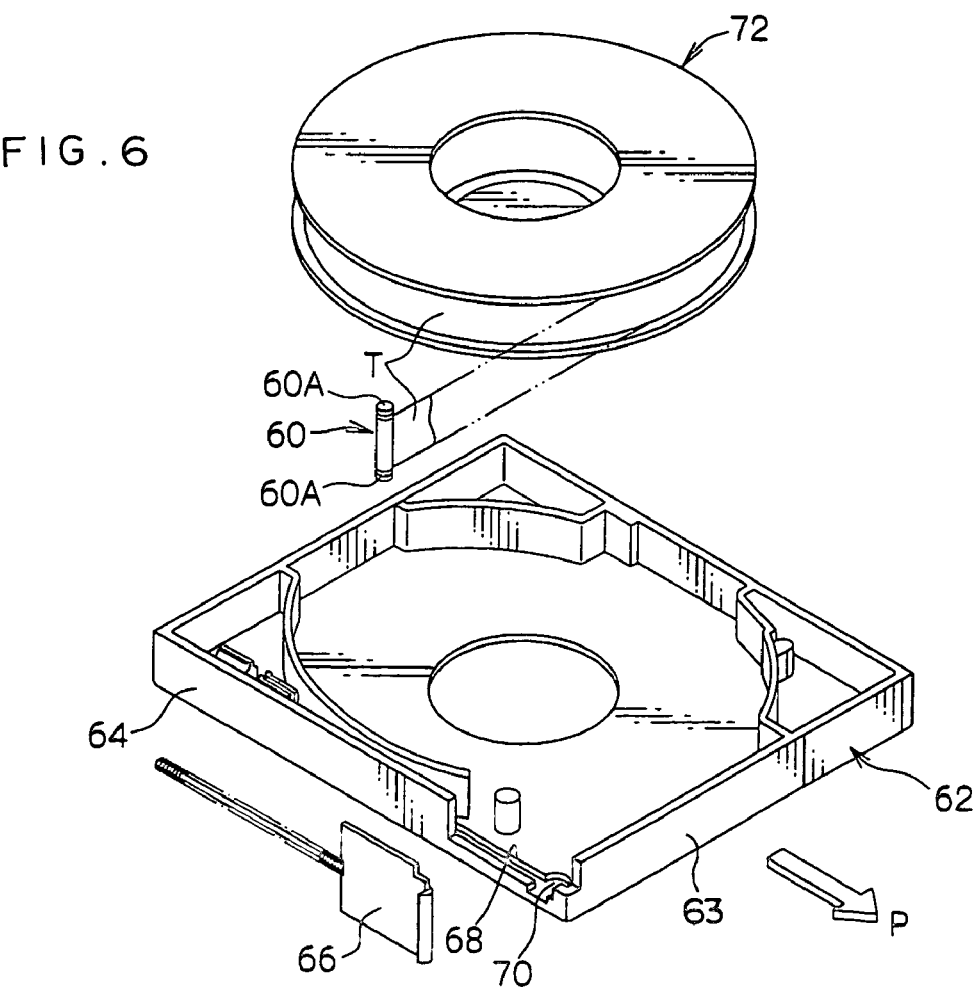

RECORDING TAPE CARTRIDGE

CROSS-REFERENCE TO RELATED APPLICATIONS

This application claims priority under 35 USC 119 from Japanese patent document, No. 2002-255102, the disclosure of which is incorporated by reference herein.

BACKGROUND OF THE INVENTION

1. Field of the Invention

The present invention relates to a recording tape cartridge accommodating, within a case, a single reel on which is wound a recording tape such as a magnetic tape or the like, the magnetic tape or the like being used as a recording/playback medium mainly of computers or the like.

2. Description of the Related Art

Conventionally, magnetic tape cartridges have been known in which a magnetic tape, which is used as a data recording/playback medium of a computer or the like, is wound on a single reel, and the reel is accommodated in a case. A leader member, such as a leader pin, a leader tape, or a leader block, is provided at the distal end of the magnetic tape. A pull-out means provided at a drive device pulls the leader member out from an opening of the magnetic tape cartridge, and winds the magnetic tape, which is fixed to the leader member, onto a take-up reel of the drive device.

A reel gear is formed in an annular form in the center of the bottom surface of a reel which emerges from an open hole formed in the bottom surface of the magnetic tape cartridge. Due to a driving gear, which is provided at a rotating shaft of the drive device, meshing with this reel gear, the reel is driven to rotate. By rotating the reel of the magnetic tape cartridge and the take-up reel of the drive device synchronously, data can be recorded onto the magnetic tape, and data recorded on the magnetic tape can be played back.

Such a magnetic tape cartridge requires little space for storage, and a large amount of information can be recorded thereon.

The position of the opening and the type of the door which opens and closes the opening differ for each type of leader member. For example, in the case of a leader pin, as shown in FIG. 6, an opening 68 for pulling out of a leader pin 60 is formed at the front end of a side wall 64 of a case 62. The opening 68 is opened and closed by a door 66 which slides in the direction of loading the magnetic tape cartridge into a drive device (the direction of arrow P) and the direction opposite thereto.

A reel 72 on which a magnetic tape T is wound is rotatably accommodated in the case 62, and the leader pin 60 is attached to the distal end of the magnetic tape T. A pair of upper and lower pin holding portions 70, which hold the leader pin 60 when the magnetic tape cartridge is not being used (is being stored or the like), are provided at the inner side of the opening 68 of the case 62. The pin holding portions 70 are concave portions which are substantially semicircular as seen in plan view, and respective one portions of the pin holding portions 70 are open so that the leader pin 60 can enter therein and exit therefrom. Both end portions 60A of the leader pin 60, which is in a state of standing upright, are inserted into these concave portions (the pin holding portions 70).

However, when the opening 68 is formed at the front end portion of the side wall 64 of the case 62 in this way, the right end portion of a front wall 63 is a free end due to the formation of the opening 68. Thus, the strength of the front wall 63 itself is relatively weak. Therefore, when the front wall 63 receives the impact of a drop, problems arise such as the leader pin 60 held at the inner side of the opening 68 falls out from the pin holding portions 70, or the position of the leader pin 60 becomes offset. Namely, the front wall 63 is the portion which is most easily damaged by the impact of a drop. Ensuring the strength of this portion has conventionally been a task to be achieved.

SUMMARY OF THE INVENTION

An object of the present invention is to provide a recording tape cartridge in which it is possible to suitably reinforce a peripheral wall (front wall) whose end portion is a free end due to the formation of an opening, and which is weak in terms of strength.

In order to achieve the above-described object, a first aspect of the present invention is a recording tape cartridge comprising: a case which is substantially rectangular, and at which an upper case and a lower case are joined together with peripheral walls thereof abutting one another, and which rotatably accommodates a single reel on which a recording tape is wound; and an opening formed at a corner portion of the case at a side of loading the case into a drive device, the opening being for pulling out of a leader member attached to an end portion of the recording tape, wherein concave portions extending over the upper case and the lower case are formed at a peripheral wall of the case at the side of loading the case into the drive device.

When the concave portions are formed in a peripheral wall of the case at the side of loading the case into a drive device (i.e., are formed at the front wall of the case) in this way, a portion of the peripheral wall (front wall) is formed by bending processing. The strength can thereby be increased. Accordingly, the impact resistance of the peripheral wall (the front wall), at whose end portion the opening is formed, can be improved. The fall-out of the leader member from holding portions, as well as positional offset of the leader member due to the impact of a drop, can be prevented.

Further, when the concave portions are formed so as to extend over the upper case and the lower case in this way, they can be used, for example, for identification with respect to drive devices.

There are cases in which the external appearances of recording tape cartridges are similar, even if the types of the recording tape cartridges are different. Thus, there are cases in which a recording tape cartridge is mistakenly loaded into a drive device which cannot record information thereon or playback information therefrom. Further, by mistakenly carrying out playback operation or the like in that state, the recording tape cartridge itself may be damaged, or the drive device may break.

In accordance with the present aspect, the above-described problems can be prevented by providing an engaging member, which engages the concave portions, at a drive device, such that whether or not recording/playback of a recording tape cartridge is possible at the drive device can be judged by way of the engaging member.

Further, in a second aspect of the present invention, the concave portions are formed to be isosceles trapezoidal in plan view.

When the concave portions are formed in this configuration, the reinforcing of the peripheral wall of the case at the side of loading the case into a drive device (i.e., the front wall) is even more effective, and the engaging with the engaging member is carried out even more reliably.

BRIEF DESCRIPTION OF THE DRAWINGS

FIG. 6 is a schematic exploded perspective view of a conventional recording tape cartridge.

DETAILED DESCRIPTION OF THE INVENTION

Hereinafter, a recording tape cartridge (magnetic tape cartridge) 10 relating to an embodiment of the present invention will be described on the basis of FIGS. 1 through 5. Note that, for convenience of explanation, the direction of loading the recording tape cartridge 10 into a drive device is denoted by arrow A, and this direction of arrow A is the forward direction (front side) of the recording tape cartridge 10. The direction of arrow B, which is orthogonal to the direction of arrow A, is the rightward direction.

Figure 1:
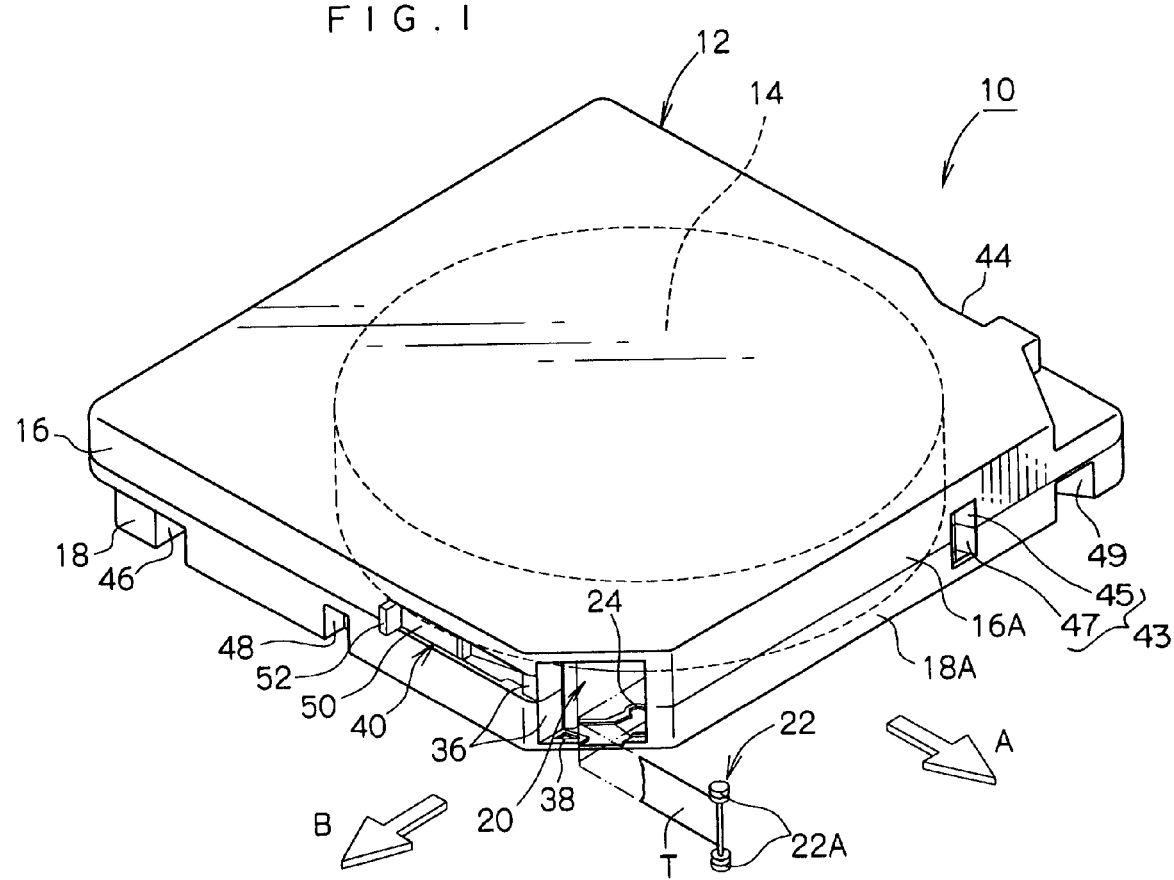
FIG. 1 is a schematic perspective view of a recording tape cartridge of the present invention.
Figure 2:
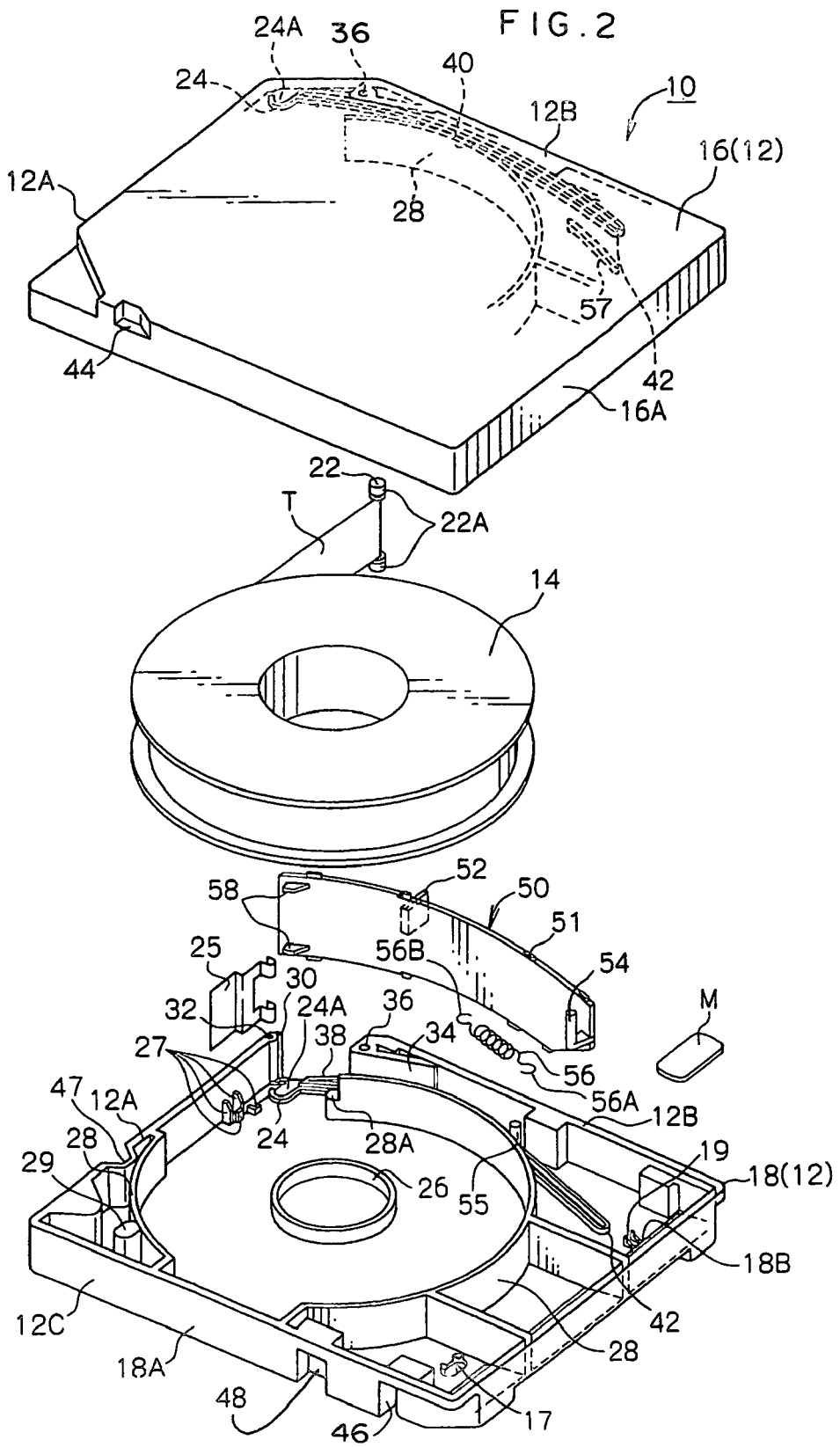
FIG. 2 is a schematic exploded perspective view of the recording tape cartridge of FIG. 1.
Figure 3:
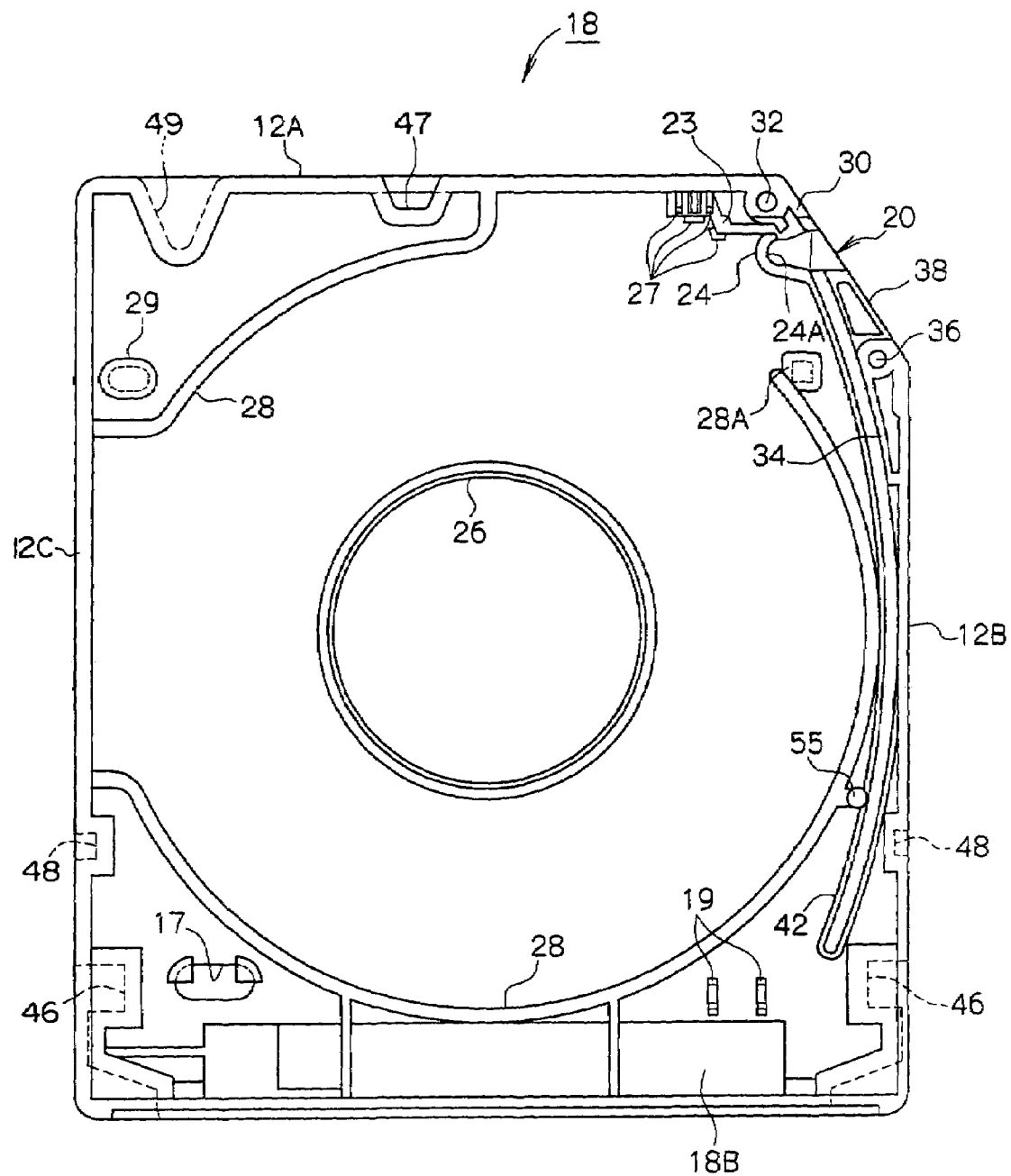
FIG. 3 is a schematic plan view of a lower case.
Figure 4:
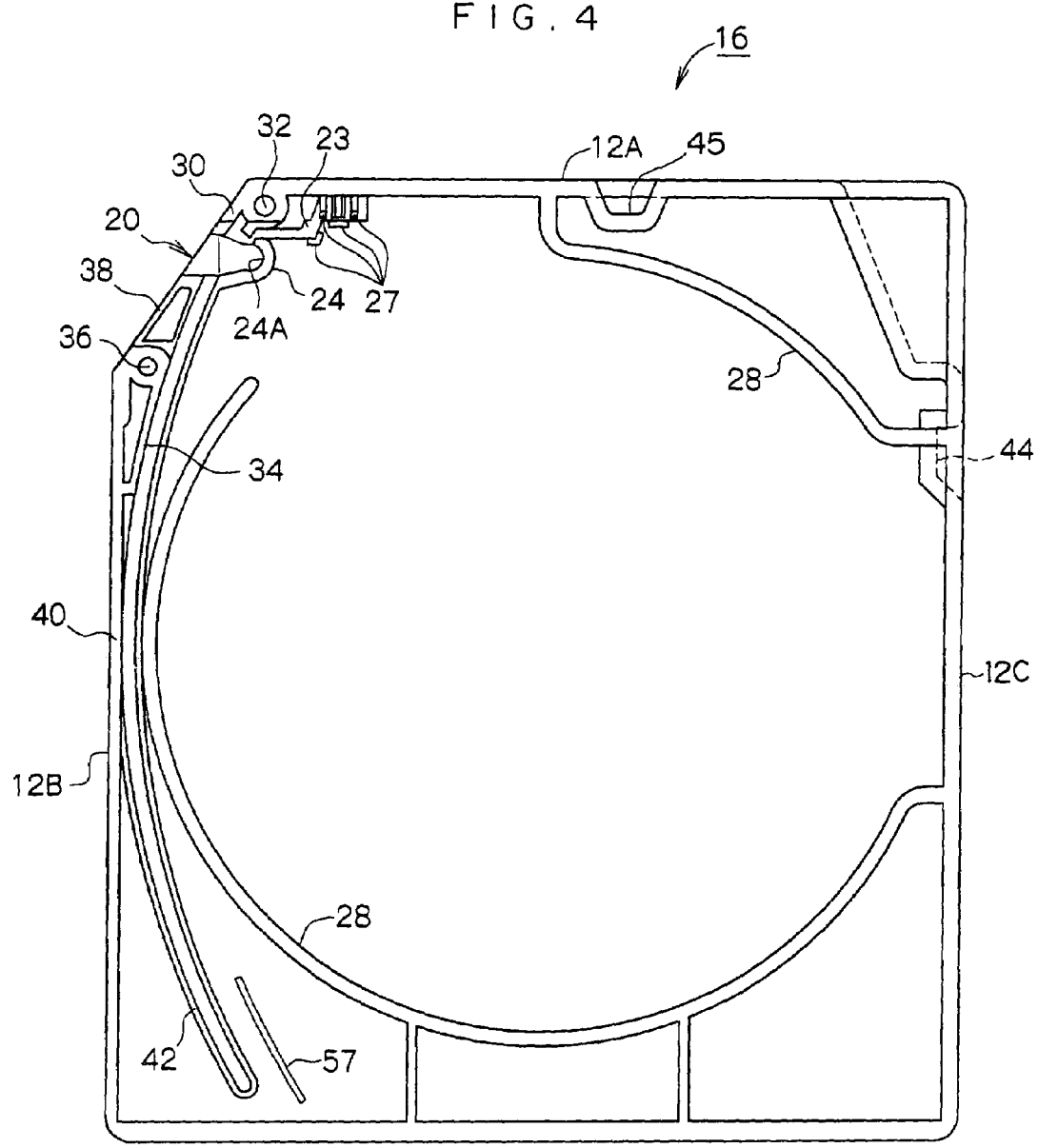
FIG. 4 is a schematic plan view of an upper case.
Figure 5:
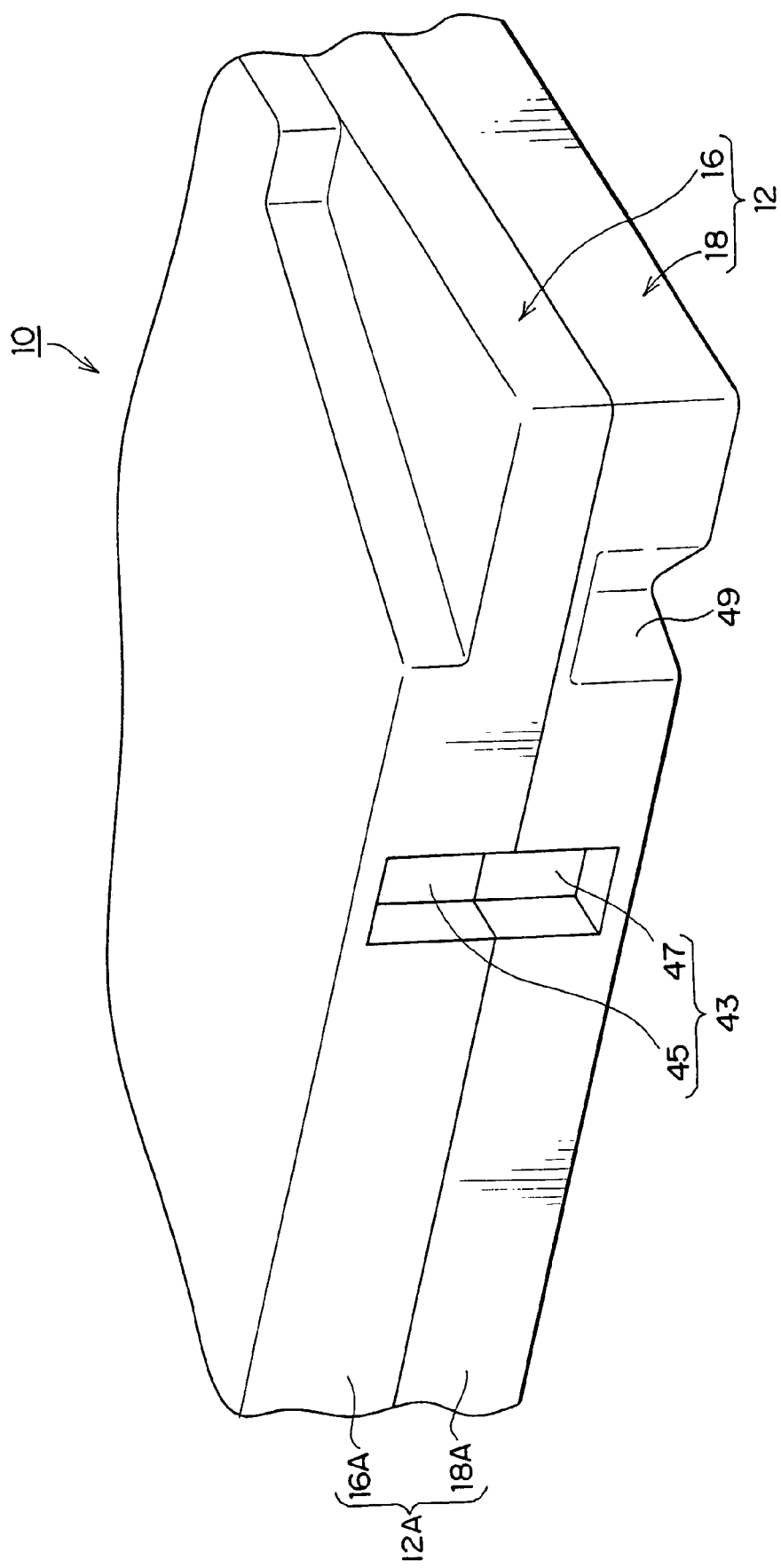
FIG. 5 is a schematic perspective view showing a front wall portion of a case.

As shown in FIGS. 1 and 2, the recording tape cartridge 10 is structured such that a single reel 14, on which is wound a magnetic tape T serving as a recording tape (i.e., an information recording/playback medium), is rotatably accommodated within a case 12 which is substantially rectangular as seen in plan view. The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off. A space for accommodating the reel 14, on which the magnetic tape T is wound, is provided at the interior of the case 12.

Further, the corner portion of the upper case 16 and the lower case 18, at which corner portion the peripheral walls 16A, 18A have been cut off, forms an opening 20 which is for pulling-out of the magnetic tape T. A leader pin 22, which is pulled-out while being anchored (engaged) by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out means. In this way, the hooks or the like do not contact and scratch the magnetic tape T at the time of pulling-out the magnetic tape T.

A pair of upper and lower pin holding portions 24, which position and hold the leader pin 22 at the interior of the case 12, are provided at the inner side of the opening 20 of the case 12. The pin holding portions 24 are formed in substantially semicylindrical shapes. The end portions of the leader pin 22 which is in a state of standing upright are held in concave portions 24A of the pin holding portions 24. The magnetic tape T pull-out sides of the outer peripheral walls of the pin holding portions 24 are open, such that the leader pin 22 can enter therein and exit therefrom.

In vicinities of the pin holding portions 24, a proximal portion of a plate spring 25 is inserted and fixed in spring holding portions 27 and groove portions 23 (see FIGS. 3 and 4) which are provided at the inner surface of a front wall 12A. (The front wall 12A is the portions of the peripheral walls 16A, 18A where the outer surfaces face in the direction of arrow A.) The distal ends of the plate spring 25, which have been divided so as to be forked in two, engage with the upper and lower end portions of the leader pin 22 and hold the leader pin 22 within the pin holding portions 24. When the leader pin 22 enters into and exits from the pin holding portions 24, the distal end portions of the plate spring 25 elastically deform appropriately so as to permit movement of the leader pin 22.

Further, a gear opening 26, which is for exposing an unillustrated reel gear of the reel 14 to the exterior, is formed in the central portion of the lower case 18. The reel 14 is driven to rotate within the case 12, as a result of the reel gear meshing with a driving gear of a drive device. Further, the reel 14 is held so as to not joggle by play restricting walls 28 which project out at portions of the inner surfaces of the upper case 16 and the lower case 18, and which serve as inner walls on a circular locus which is coaxial with the gear opening 26.

A bag portion 28A, in which a hole for position regulation is formed, is provided so as to be continuous with the end portion of the play restricting wall 28 in a vicinity of the opening 20. Further, a bag portion 29, in which is formed a hole for position regulation which is a long hole, is provided so as to be set apart from the play restricting wall 28 at the inner side of the front left corner portion of the case 12. The bag portions 28A, 29 are disposed on a single straight line which extends along the direction of arrow B. The end portions of the play restricting walls 28, except for the end portion thereof at which the bag portion 28A is continuous, are continuous with the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A rear portion inner wall 18B is formed at an inclined surface of a predetermined angle and the memory board M is supported by supporting projections 19 so as to be inclined at a predetermined angle, such that sensing is possible at a drive device which reads information from the bottom surface side of the memory board M and at a library device (a device which accommodates a plurality of the recording tape cartridges 10 and which automatically loads and removes the recording tape cartridges 10 into and from drive devices) which reads information from the rear wall side of the memory board M.

Further, an unillustrated write protect portion, which determines whether recording onto the recording tape cartridge 10 is possible or not, is provided at the left rear portion of the lower case 18. An open hole 17, through which projects an operating projection (not illustrated) which operates the write protect portion, is formed in the left rear portion of the lower case 18.

A pair of top and bottom inclined wall portions 30, which are short and which prescribe the front edge portion of the opening 20, are formed at the right end portion of the front wall 12A of the case 12. The inclined wall portions 30 are bent along the plane of opening of the opening 20. The inclined wall portions 30 serve as dust proofing walls, such that no space through which dust or the like can enter arises, due to the distal end of a door 50, which is substantially arc-shaped in plan view and which will be described later, entering in at the inner side of the inclined wall portions 30 when the opening 20 is closed. Further, a pair of upper and lower screw bosses 32 are continuous with the inner side of the front wall 12A in vicinities of the left sides of the inclined wall portions 30.

A pair of upper and lower inclined wall portions 34, which are shaped, in plan view, so as to substantially follow along the outer peripheral surface of the door 50 which will be described later, are provided at inner side of the front end portion of a right wall 12B of the case 12. (The right wall 12B is the portions of the peripheral walls 16A, 18A where the outer surfaces thereof face in the direction of arrow B.) The front end surfaces of the inclined wall portions 34 prescribe the rear edge of the opening 20. A pair of upper and lower screw bosses 36 are provided at the front end portions of the inclined wall portions 34.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting-out the lower portion of the front side of the peripheral wall 16A of the upper case 16 which forms the right wall 12B, and the slit 40 opens toward the opening 20 as well. Forming the slit 40 in this way such that a portion of the peripheral wall 16A remains at the upper side is preferable in that the rigidity of the case 12 can be maintained. In particular, it is more preferable that the upper side wall prescribing the slit 40 be integral and continuous with the inclined wall portion 34.

A concave portion 48 is formed at the rear side of the lower case 18. The portion of the concave portion 48, other than the upper end of the peripheral wall 18A, is recessed toward the inner side of the case 12 in a substantially U-shaped configuration as seen in cross-sectional view, and this portion of the concave portion 48 is also recessed upwardly from the bottom surface of the case 12 (i.e., the bottom plate is cut-out). The concave portion 48 is formed at the left wall of the case 12 as well. The concave portions 48 are engagement portions which, for example, a pull-in means of a drive device engages. The bottom surfaces (the downwardly-facing surfaces) of the concave portions 48 serve as reference surfaces for positioning within a drive device.

Concave portions 46 are formed at the rear sides of the concave portions 48. The portion of the concave portion 46, other than the upper end of the peripheral wall 18A, is recessed toward the inner side of the case 12 in a substantially U-shaped configuration as seen in cross-sectional view, and this portion of the concave portion 46 is also recessed upwardly from the bottom surface of the case 12 (i.e., the bottom plate is cut-out). The concave portions 46 are engagement portions which a grasping mechanism of a library device engages. By providing the concave portions 46, 48, the torsional strength of the case 12 (the lower case 18) is improved. Moreover, a concave portion 44, which is substantially trapezoidal as seen in plan view, is formed in the top surface portion of the left wall of the upper case 16. This concave portion 44 serves as an engagement portion which is engaged by a holding member (not shown) for canceling the rotational moment generated in association with the movement of a door 50 in the direction of opening at the time of opening the opening 20.

Guide wall portions 42, which are predetermined heights (e.g., about 1.0 mm to 1.5 mm) and which support convex portions 51 of the door 50 which will be described later such that the convex portions 51 are nipped from both the inner surface side and the outer surface side, stand erect at the upper case 16 and the lower case 18 in a vicinity of the inclined wall portions 30, and from a vicinity of the opening 20 to a vicinity of the rear wall. The guide wall portions 42 are formed in substantial arc-shapes as seen in plan view, and have different lengths at the upper case 16 and the lower case 18. The guide wall portion 42 at the upper case 16 is formed such that the rear side thereof is longer than that of the guide wall portion 42 at the lower case 18. This is because the memory board M is disposed so as to be inclined at a predetermined angle at the right wall 12B side of the rear portion inner wall 18B of the lower case 18.

Further, the rear end portions of the guide wall portions 42 are closed in substantial arc-shapes as seen in plan view, and restrict the convex portions 51 which are furthest toward the rear at both the top and bottom of the door 50 such that the door 50 cannot move any further rearward. On the other hand, the front end portions of the guide wall portions 42 are open, and extend to positions which, when the leader pin 22 is entering and exiting, do not impede the entry or exit of the leader pin 22 (e.g., positions which are about half of the opening width of the opening 20 and which are further rearward than the pin holding portions 24).

Further, ribs 38, which are substantially trapezoidal in plan view and which are integral with the guide wall portions 42 at the outer sides which are exposed from the opening 20, stand erect at the inner surface of the upper case 16 and the inner surface of the lower case 18 so as to be the same heights as these guide wall portions 42. The strength of the upper case 16 and the lower case 18 at the opening 20 portion is ensured by these ribs 38. Note that the inner side guide wall portions 42 are integral and continuous with the pin holding portions 24. It is preferable that the heights of the pin holding portions 24 are formed to be substantially the same as or greater than the heights of the guide wall portions 42 with which the pin holding portions 24 are integral and continuous.

The upper case 16 and the lower case 18 which were described above are fixed (joined) together by unillustrated screws being screwed, from beneath, into the screw bosses 32, 36 which are positioned in the vicinities of the edge portions of the opening 20. In this way, the corner portions at both ends of the opening 20, which are prescribed by the free ends of the inclined wall portions 30 (the front wall 12A) and the inclined wall portions 34 (the right wall 12B) and which are disadvantageous in terms of strength and which easily hit the ground or the like when the case 12 is dropped, are joined together strongly. Even if the case 12 is dropped and the entire weight of the recording tape cartridge 10 is applied to the opening 20, it is unlikely that the case 12 deforms or buckles, or a positional offset arises thereat.

The opening 20 is opened and closed by the door 50 which serves as a shielding member. The plate width (height) of at least the portion of the door 50 which closes the opening 20 is formed to be substantially the same as the opening height of the opening 20. The plate length of the door 50 is formed to be sufficiently larger than the opening width of the opening 20. The door 50 is formed in a substantial arc-shape as seen in plan view which curves along the direction of plate thickness, such that the door 50 can move along a predetermined circumference.

The door 50 closes the opening 20 in a state in which the distal end portion of the door 50 has entered into the guide wall portions 42 in a vicinity of the inclined wall portions 30. When the door 50 slides (rotates) substantially rearward along the aforementioned predetermined circumference and opens the opening 20, and the outer peripheral surface of the door 50 in a vicinity of the distal end thereof reaches a vicinity of the screw bosses 36, the door 50 completely opens the opening 20. The door 50 closes the opening 20 by sliding (rotating) in the direction opposite to the direction at the time of opening the opening 20.

In this way, the door 50 is curved in an arc-shape which corresponds to a predetermined circumference which is the locus of movement of the door 50. In the present embodiment, the center of rotation of the door 50 is set such that the left-right direction position thereof is in a vicinity of the left end of the case 12 and the front-back direction position thereof is in a vicinity of the rear end of the slit 40. In this way, the locus of movement of the door 50 comes closest to the right wall 12B of the case 12 in a vicinity of the rear end of the slit 40. Note that the center of rotation and the radius of the door 50 may be appropriately determined in accordance with the positions of the front and rear edge portions of the opening 20 (the inclined wall portions 30 and the screw bosses 36) which are determined in accordance with requirements of drive devices, or the angle of the plane of opening of the opening 20 which is determined in accordance with requirements of library devices, or the like.

The curved longitudinal dimension of the door 50 is determined such that, in the state in which the door 50 closes the opening 20, the rear end portion of the door 50 is positioned in the right rear corner portion of the case 12, which is further toward the rear than the concave portion 48 (i.e., the right rear corner portion in a vicinity of the concave portion 46). The bottom rear portion of the door 50 is cut obliquely in order to avoid the memory board M which is disposed so as to be inclined at a predetermined angle at the rear portion inner wall 18B of the lower case 18.

The convex portions 51 project from the top surface and the bottom surface of the door 50. The convex portions 51 abut the guide surfaces of the guide wall portions 42 (the inner surfaces which oppose each other) and the inner surface of the upper case 16 and the inner surface of the lower case 18 between the guide wall portions 42, and guide the door 50 in the directions of opening and closing the opening 20. The convex portions 51 are formed in substantially oval shapes as seen in plan view which are long along the longitudinal direction of the door 50. Four convex portions 51 project at each of the top surface and the bottom surface of the door 50 so as to have top/bottom symmetry (except for the convex portions 51 furthest toward the rear), and so as to project to substantially the same heights as the heights of the guide wall portions 42. Note that the convex portions 51 furthest toward the rear do not have top/bottom symmetry because the bottom rear portion of the door 50 is cut obliquely.

When the convex portions 51 are provided, the sliding resistance (friction) between, on the one hand, the door 50, and, on the other hand, the guide surfaces of the guide wall portions 42 and the inner surface of the upper case 16 and the inner surface of the lower case 18 between the guide wall portions 42, can be reduced, and the door 50 can be slid smoothly with little resistance. Note that, when the convex portions 51 are formed in substantially oval shapes as seen in plan view, the impact resistance thereof is better than if, for example, the convex portions 51 were to be formed in substantially circular shapes as seen in plan view. Accordingly, even if force is applied to the door 50 from a direction other than the opening/closing directions due to the impact of a drop or the like, there is substantially no possibility that the convex portions 51 will break.

An operation projection 52 serving as an operation portion projects along the radial direction of the door 50 from the outer peripheral surface of the door 50 at a region which is slightly further forward than the longitudinal direction central portion of the door 50 (a vicinity of the border portion where the plate width of the door 50 changes). The operation projection 52 is exposed to the exterior of the case 12 from the slit 40. In the state in which the opening 20 is closed, the operation projection 52 is positioned so as to be slightly set apart from the rear end of the screw boss 36, and can be operated from the portion of the slit 40 which opens toward the front. Further, in the state in which the opening 20 is open, the operation projection 52 is positioned so as to be slightly set apart from the rear edge of the slit 40. At this time, the rear most convex portions 51 abut the rear end portions of the guide wall portions 42.

Although the interior and the exterior of the case 12 communicate via the slit 40 for exposing the operation projection 52, adhesion of dust and the like to the magnetic tape T wound on the reel 14 is prevented by the play restricting walls 28 which serve as inner walls, and due to the fact that the slit 40 is always substantially closed by the screw boss 36 and by the door 50 which extends over substantially the entire height in the case 12.

Further, stoppers 58, which abut the upper end portion side surface and the lower end portion side surface of the leader pin 22 when the opening 20 is closed, project at the inner surface of the front end portion of the door 50. The stoppers 58 even further prevent the leader pin 22 from falling out from the pin holding portions 24 due to impact at the time of a drop or the like. Further, a coil spring 56, which serves as an urging member which urges the door 50 in the direction of closing the opening 20, has a length such that it extends to the rear right corner portion of the case 12 in the state in which the door 50 closes the opening 20. Thus, the space between the play restricting walls 28 and the right wall 12B (the peripheral walls 16A, 18A) at the rear right corner portion can be utilized effectively.

Namely, a spring holding portion 54, which is substantially L-shaped in rearview, projects integrally at the inner peripheral surface of the door 50 in the vicinity of the rear end thereof, so as to be directed upwardly. A solid cylindrical spring anchor portion 55 projects upwardly at the inner surface of the lower case 18 in a vicinity of the concave portion 48. Ring-shaped attachment portions 56A, 56B are formed at the both ends of the coil spring 56. Accordingly, the one attachment portion 56B of the coil spring 56 is placed on the spring anchor portion 55 from above such that the spring anchor portion 55 is inserted through the attachment portion 56B, and the other attachment portion 56A is placed on the spring holding portion 54 from above such that the spring holding portion 54 is inserted through the attachment portion 56A. The coil spring 56 can thereby be attached simply within the aforementioned space.

A rib 57, which the top end of the spring holding portion 54 slidingly contacts at the time when the door 50 is opening and closing, stands erect in a substantial arc-shape in plan view at the upper case 16. The rib 57 is disposed at a position and has a length such that the top end of the spring holding portion 54 can slidingly contact the rib 57 at least when the door 50 starts to move (open). Due to the rib 57 suitably guiding the spring holding portion 54 which moves against the urging force of the coil spring 56, the door 50 can be opened more stably (i.e., at the time of opening, the door 50 does not shake due to the urging force of the coil spring 56).

A concave portion 43, which is recessed toward the inner side of the case 12, is formed in an isosceles trapezoidal form in planar sectional view, at the substantial center in the top-bottom direction of the front wall 12A of the case 12 of the recording tape cartridge 10. As illustrated, the concave portion 43 is formed so as to extend over the peripheral wall 16A of the upper case 16 and the peripheral wall 18A of the lower case 18, and is formed without cutting out the ceiling plate of the upper case 16 or the bottom plate of the lower case 18.

Namely, a concave portion 45 is formed by hollowing out a portion of the peripheral wall 16A, except for the ceiling plate portion of the upper case 16, in an isosceles trapezoidal form as seen in planar sectional view, toward the interior of the case 12. A concave portion 47 is formed by hollowing out a portion of the peripheral wall 18A, except for the bottom plate portion of the lower case 18, in an isosceles-trapezoidal form as seen in planar sectional view, toward the interior of the case 12. The concave portion 43 is formed by the concave portions 45, 47 communicating with one another after the case 12 has been assembled (i.e., after the upper case 16 and the lower case 18 have been joined together). It goes without saying that the position at which the concave portion 43 (the concave portions 45, 47) is formed is an appropriate position which does not interfere with the reel 14, the spring holding portions 27, and the like.

When the concave portion 43 (the concave portions 45, 47) are formed, the rigidity of the peripheral wall 12A (the peripheral walls 16A, 18A) can be increased. Namely, because the concave portion 43 is formed by bending a portion of the peripheral wall 12A (the peripheral walls 16A, 18A), strength can be improved thereby. Accordingly, even if the front wall 12A is subjected to an impact due to a drop or the like, flexural deformation of the front wall 12A can be suppressed, and the leader pin 22 can be prevented from falling out from the pin holding portions 24.

Further, a concave portion 49 for position regulation, which is recessed inwardly in a substantially triangular shape as seen in bottom view, is formed at the lower side (the peripheral wall 18A) of the front wall 12A, at a left wall 12C side thereof. The position of the loaded recording tape cartridge 10 is regulated by the concave portion 49 for position regulation engaging with an engaging member (not shown) of a drive device. Then, after the position of the recording tape cartridge 10 has been regulated by the concave portion 49 for position regulation, positioning members (not shown) of the drive device are inserted in the holes for position regulation of the aforementioned bag portions 28A, 29. The recording tape cartridge 10 loaded into the drive device (bucket) is thereby positioned precisely.

Further, in the same way, an engaging member (not illustrated) of the drive device may engage with the concave portion 43 such that the concave portion 43 can be used for various types of identification, e.g., for identifying whether or not information can be recorded onto and played-back from the recording tape cartridge 10 at that drive device. Namely, an engaging member, which is different than the engaging member which engages the concave portion 49 for position regulation, is provided at the drive device, and this engaging member is adapted to engage with the concave portion 43, when the recording tape cartridge 10 is loaded in the drive device.

With such a structure, when, for example, the concave portion 43 (the concave portions 45, 47) is not provided at the front wall 12A, the front wall 12A will interfere with this engaging member, and it is therefore possible to judge that recording/playback are impossible. If the concave portion 43 (the concave portions 45, 47) is provided, the engaging member engages with the concave portion 43 (the concave portions 45, 47), and it is therefore possible to judge that recording/playback are possible.

Accordingly, the respective recording tape cartridges 10 can be loaded in drive devices respectively suited thereto (drive devices at which recording/playback are possible). Therefore, there is no trouble, which occurred in the conventional art and which was caused by the recording tape cartridge 10 being loaded into a wrong drive device, such as the recording tape cartridge 10 being damaged, the drive device breaking, or the like.

Note that the aforementioned engaging members, which are provided at the bucket or the like of the drive device, may be any type of structure, provided that they are structured so as to be able to enter into the concave portion 49 for position regulation and the concave portion 43. For example, the engaging member may be a simple structure such as a solid cylindrical pin which projects in a fixed state. Further, the concave portion 43 is formed so as to be spread over the upper case 16 and the lower case 18, and is formed in a substantially isosceles trapezoidal configuration as seen in a planar sectional view. Therefore, the concave portion 43 is a shape which widens relatively greatly toward the left and the right. Accordingly, the engaging member can be reliably engaged with the concave portion 43.

Next, operation of the present embodiment at the recording tape cartridge 10 having the above-described structure will be described. When the recording tape cartridge 10 having the above-described structure is not being used (e.g., is being stored or transported or the like), the opening 20 is closed by the door 50. Then, when the magnetic tape T is to be used, the recording tape cartridge 10 is loaded into the bucket of a drive device along the direction of arrow A, with the side in which the concave portion 49 for position regulation is formed being the leading side.

Then, first, an engaging member provided in the bucket relatively enters into and engages with (abuts) the concave portion 49 for position regulation. At this time, if an engaging member which engages the concave portion 43 (the concave portions 45, 47) is also provided, it is possible to instantly identify the recording tape cartridges 10 suitable for that drive device (i.e., identify whether or not recording/playback are possible with the recording tape cartridges 10).

Namely, when it is judged that recording/playback are not possible, it is possible to remove that recording tape cartridge 10 and load it into another drive device. Therefore, recording/playback are not mistakenly carried out. Accordingly, the recording tape cartridge 10 is not damaged, and the drive device is prevented from being broken. The concave portion 43 is formed to stretch over the upper case 16 and the lower case 18, and is formed in an isosceles trapezoidal shape as seen in planar sectional view. Therefore, even if there is some error in the position at which the engaging member is disposed, the concave portion 43 can reliably be engaged by the engaging member.

In this way, when it is judged that recording/playback are possible and the position of the recording tape cartridge 10 within the bucket is regulated, the recording tape cartridge 10 is, together with the bucket (not shown), moved in the direction of arrow A, and the door 50 of the recording tape cartridge 10 is opened. Namely, an opening/closing member (not shown) provided at the drive device enters into the slit 40 which opens toward the front, and engages with the operation projection 52 of the door 50.

Then, in this state, when the recording tape cartridge 10, together with the bucket, moves further in the direction of arrow A, the opening/closing member moves the operation projection 52 relatively rearward against the urging force of the coil spring 56. Then, the door 50, from which the operation projection 52 projects, rotates clockwise in plan view along the direction of curving thereof, while the convex portions 51 are guided by the guide wall portions 42. Namely, due to the guide wall portions 42, the door 50 moves substantially rearward so as to circle around the outer sides of the pin holding portions 24 and the reel 14 without jutting out from the locus of movement along the curved configuration of the door 50, and opens the opening 20.

Then, when the recording tape cartridge 10 is loaded to a predetermined depth in the drive device and the opening 20 is completely opened, positioning members (not illustrated) of the drive device are inserted into the holes for position regulation which are formed in the bag portions 28A, 29. The recording tape cartridge 10 is thereby accurately positioned within the drive device, and further rotation (substantially rearward movement) of the door 50 is restricted.

Then, the pull-out means of the drive device enters into the case 12 from the opening 20 which has been opened. The pull-out means grasps and pulls-out the leader pin 22 which is positioned and held at the pin holding portions 24. At this time, the pull-out member can reliably grasp the leader pin 22 because the recording tape cartridge 10 is accurately positioned within the drive device.

The leader pin 22 which has been pulled-out from the opening 20 is accommodated at a take-up reel (not shown). Then, the take-up reel and the reel 14 are driven to rotate synchronously. The magnetic tape T is thereby successively pulled-out from the case 12 while being taken-up onto the take-up reel. Information is recorded or played back by a recording/playback head or the like disposed along a predetermined tape path.

On the other hand, when the magnetic tape T is rewound onto the reel 14 and the recording tape cartridge 10 is to be ejected from the drive device, the positioning members are pulled out from the holes for position regulation or the like, and the positioned state of the recording tape cartridge 10 with respect to the drive device is cancelled. Then, the recording tape cartridge 10 is, together with the bucket, first moved by an unillustrated ejecting mechanism in the direction opposite to the direction of arrow A.

Accompanying this movement, while the convex portions 51 are guided in the guide wall portions 42, the door 50 rotates in the direction of closing the opening 20 due to the urging force of the coil spring 56, such that the opening 20 is completely closed (is returned to the initial state). The recording tape cartridge 10, whose opening 20 has been closed, is then moved from the interior of the bucket in the direction opposite to the direction of arrow A, by an unillustrated ejecting mechanism. The concave portion 49 for position regulation and the concave portion 43 (the concave portions 45, 47) move away from the respective engaging members, and the recording tape cartridge 10 is completely ejected from the drive device.

Here, by forming the opening 20 of the recording tape cartridge 10 by cutting off the front right corner portion of the case 12, the plane of opening, of the opening 20, is directed in the direction of arrow A and in the direction of arrow B. Thus, the pull-out means of the drive device can access and engage the leader pin 22 from the direction of arrow A, or from the direction of arrow B, or from a direction between the direction of arrow A and the direction of arrow B. Namely, the range over which the pull-out means of the drive device can engage the leader pin 22 is broadened. Therefore, the position at which the pin holding portions 24 are disposed can be set in accordance with the specifications of the pull-out means, and the degrees of freedom in designing the drive device can be increased.

Moreover, because the concave portion 43 (the concave portions 45, 47) is formed in the front wall 12A (the peripheral walls 16A, 18A) at whose end portion the opening 20 is formed, the strength of the front wall 12A can be improved, and flexural deformation of the front wall 12A due to the impact of a drop can be suppressed. Accordingly, it is possible to prevent the leader pin 22 from falling out from the pin holding portions 24 or the position of the leader pin 22 from becoming offset.

As described above, in accordance with the present invention, it is possible to improve the strength of a peripheral wall, at the side of loading into a drive device, at which peripheral wall an opening is formed at the end portion thereof.

What is claimed is:

1. A recording tape cartridge comprising:
a case which is substantially rectangular, and at which an upper case and a lower case are joined together with peripheral walls thereof abutting one another, and which rotatably accommodates a single reel on which a recording tape is wound, the peripheral walls respectively intersecting a top face of the upper case at an upper edge and a bottom face of the lower case at a lower edge; and
an opening formed at a corner portion of the case at a side of loading the case into a drive device, the opening being for pulling out of a leader member attached to an end portion of the recording tape,
wherein concave portions extending over the upper case and the lower case are formed at a peripheral wall of the case, said peripheral wall faces in a forward loading direction which the cartridge moves when loaded into the drive device, such that the concave portions do not extend to the upper edge and the lower edge.

2. The recording tape cartridge of claim 1, wherein the concave portions are formed to be isosceles trapezoidal in plan view.

3. The recording tape cartridge of claim 1, wherein the concave portion of the upper case and the concave portion of the lower case are structured such that peripheral walls of the concave portion of the upper case and the concave portion of the lower case completely overlap when the upper case and the lower case are joined together.

4. The recording tape cartridge of claim 3, wherein, in a heightwise direction of the upper case, a height of the concave portion of the upper case is lower than a height of the upper case, and in a heightwise direction of the lower case, a height of the concave portion of the lower case is shorter than a height of the lower case.

5. The recording tape cartridge of claim 4, wherein configurations of the concave portion of the upper case and the concave portion of the lower case are substantially the same.

6. The recording tape cartridge of claim 4, wherein the concave portion of the upper case and the concave portion of the lower case are formed in shapes which would result from bending processing of a portion of a side wall of the case, which side wall is formed by a wall surface of the upper case and a wall surface of the lower case when the upper case and the lower case are joined together.

7. The recording tape cartridge of claim 6, wherein the concave portions are formed in rib shapes which project toward an inner side of the case.

8. The recording tape cartridge of claim 1, wherein the concave portions are formed in configurations such that an engaging member of a drive device, which drives the reel, can engage with the concave portions.

9. The recording tape cartridge of claim 1, further including a pin holding portion which holds the leader member, the pin holding member being closer to the peripheral wall having the concave portions than any other peripheral wall of the recording tape cartridge.

10. A recording tape cartridge comprising:
a case which is substantially rectangular, and at which an upper case and a lower case are joined together with peripheral walls thereof abutting one another, and which rotatably accommodates a single reel on which a recording tape is wound, the peripheral walls respectively intersecting a top face of the upper case at an upper edge and a bottom face of the lower case at a lower edge; and
an opening formed at a corner portion of the case at a side of loading the case into a drive device, the opening being for pulling out of a leader member attached to an end portion of the recording tape,
wherein concave portions are formed so as to extend over the upper case and the lower case, in a peripheral wall of the case in a vicinity of the opening, and the concave portions are formed in shapes which would result from bending processing of a portion of the peripheral wall, said peripheral wall faces in a forward loading direction which the cartridge moves when loaded into the drive device, such that the concave portions do not extend to the upper edge and the lower edge.

11. The recording tape cartridge of claim 10, wherein the concave portions are formed to be isosceles trapezoidal in plan view.

12. The recording tape cartridge of claim 10, wherein the concave portion of the upper case and the concave portion of the lower case are structured such that peripheral walls of the concave portion of the upper case and the concave portion of the lower case completely overlap when the upper case and the lower case are joined together.

13. The recording tape cartridge of claim 12, wherein, in a heightwise direction of the upper case, a height of the concave portion of the upper case is lower than a height of the upper case, and in a heightwise direction of the lower case, a height of the concave portion of the lower case is shorter than a height of the lower case.

14. The recording tape cartridge of claim 13, wherein configurations of the concave portion of the upper case and the concave portion of the lower case are substantially the same.

15. The recording tape cartridge of claim 13, wherein the concave portions are formed in rib shapes which project toward an inner side of the case.

16. The recording tape cartridge of claim 10, wherein the concave portions are formed in configurations such that an engaging member of a drive device, which drives the reel, can engage with the concave portions.

17. The recording tape cartridge of claim 10, further including a pin holding portion which holds the leader member, the pin holding member being closer to the peripheral wall having the concave portions than any other peripheral wall of the recording tape cartridge.

18. A recording tape cartridge comprising:
a case which is substantially rectangular, and at which an upper case and a lower case are joined together with peripheral walls thereof abutting one another, and which rotatably accommodates a single reel on which a recording tape is wound, the peripheral walls respectively intersecting a top face of the upper case at an upper edge and a bottom face of the lower case at a lower edge;
an opening formed at a corner portion of the case at a side of loading the case into a drive device, the opening being for pulling out of a leader member attached to an end portion of the recording tape,
wherein concave portions are formed so as to extend over the upper case and the lower case, in a peripheral wall of the case in a vicinity of the opening, said peripheral wall faces in a forward loading direction which the cartridge moves when loaded into the drive device, and the concave portions are formed in rib shapes which project toward an inner side of the case, and in configurations such that an engaging member of a drive device, which drives the reel, can engage with the concave portions, such that the concave portions do not extend to the upper edge and the lower edge.

19. The recording tape cartridge of claim 18, wherein the concave portions are formed to be isosceles trapezoidal in plan view.

20. The recording tape cartridge of claim 18, wherein the concave portion of the upper case and the concave portion of the lower case are structured such that peripheral walls of the concave portion of the upper case and the concave portion of the lower case completely overlap when the upper case and the lower case are joined together.

21. The recording tape cartridge of claim 20, wherein, in a heightwise direction of the upper case, a height of the concave portion of the upper case is lower than a height of the upper case, and in a heightwise direction of the lower case, a height of the concave portion of the lower case is shorter than a height of the lower case.

22. The recording tape cartridge of claim 21, wherein configurations of the concave portion of the upper case and the concave portion of the lower case are substantially the same.

23. The recording tape cartridge of claim 18, further including a pin holding portion which holds the leader member, the pin holding member being closer to the peripheral wall having the concave portions than any other peripheral wall of the recording tape cartridge.

* * * * *